(12) United States Patent
Grandics

(10) Patent No.: US 8,004,250 B2
(45) Date of Patent: Aug. 23, 2011

(54) PYRAMID ELECTRIC GENERATOR

(76) Inventor: Peter Grandics, Carlsbad, CA (US)

( * ) Notice: Subject to any disclaimer, the term of this patent is extended or adjusted under 35 U.S.C. 154(b) by 476 days.

(21) Appl. No.: 12/140,887

(22) Filed: Jun. 17, 2008

(65) Prior Publication Data

US 2008/0315587 A1    Dec. 25, 2008

Related U.S. Application Data

(63) Continuation-in-part of application No. PCT/US2007/069804, filed on May 25, 2007.

(60) Provisional application No. 60/818,360, filed on Jul. 3, 2006.

(51) Int. Cl.
*H02N 1/00* (2006.01)

(52) U.S. Cl. ............. 322/27; 290/1 R; 322/32; 322/2 A

(58) Field of Classification Search ............ 372/32, 372/123; 290/1 R, 2, 1 A; 244/158 R, 166, 244/172; 322/27

See application file for complete search history.

(56) References Cited

U.S. PATENT DOCUMENTS

| | | | |
|---|---|---|---|
| 1,540,998 A | 1/1921 | Plauson | |
| 2,813,242 A | 11/1957 | Crump | |
| 3,013,201 A | 12/1961 | Goldie | |
| 4,127,804 A | 11/1978 | Breaux | |
| 4,151,409 A | 4/1979 | O'Hare | |
| 4,595,852 A | 6/1986 | Gundlach | |
| 5,052,638 A | 10/1991 | Minovitch | |
| 5,148,461 A * | 9/1992 | Shoulders | 378/119 |
| 5,153,901 A * | 10/1992 | Shoulders | 378/119 |
| 5,305,974 A | 4/1994 | Willis | |
| 5,502,354 A * | 3/1996 | Correa et al. | 315/111.01 |
| 5,813,217 A | 9/1998 | Beall | |
| 5,966,986 A | 10/1999 | Laul | |
| 6,089,511 A | 7/2000 | Rasmusson | |
| 6,193,194 B1 | 2/2001 | Minovitch | |

(Continued)

FOREIGN PATENT DOCUMENTS

WO    WO01/49804 A2    7/2001

OTHER PUBLICATIONS

R.V. Anderson, in Electrical Processes in Atmospheres (H. Dolezalek & R. Reiter, eds., Steinkopff, Darmstadt, 1977), pp. 87-99.

(Continued)

*Primary Examiner* — T C Patel
*Assistant Examiner* — Iraj A Mohandesi
(74) *Attorney, Agent, or Firm* — Michael B. Farber

(57) ABSTRACT

A pyramid electric generator for harvesting the vibrational energies of Earth's atomic oscillators according to the present invention comprises: (1) an antenna/waveguide that is geometrically optimized; (2) a secondary coil wound with an insulated conductor on a nonconductive coil form, the coil being attached electrically to the conducting surface of the antenna/waveguide such that the secondary coil is attached near the point at which the electric field contacts the antenna/waveguide; (3) the antenna/waveguide connected with the secondary coil serving as a quasi-capacitive series element to provide a specific resonant frequency; and (4) a primary coil of a few turns wound around the secondary coil, the secondary coil being positioned coaxially within the primary coil and acting as a resonant step-up transformer winding, inductively coupled with the primary coil. The generator resonantly couples into specific frequencies of Earth's atomic oscillators and extracts electric energy therefrom.

19 Claims, 5 Drawing Sheets

U.S. PATENT DOCUMENTS 6,974,110 B2     12/2005    Grandics

OTHER PUBLICATIONS

R.G. Roble & I. Tzur, in the Earth's Electrical Environment, Studies in Geophysics (National Academy Press, Washington, D.C. 1986), pp. 206-231.

R. Feynman, Lectures on Physics (Addison-Wesley, Inc., Palo Alto, California, 1964) v.2, ch.9, pp. 1-11.

W.R. Gringel et al., in the Earth's Electrical Environment, Studies in Geophysics (National Academy Press, Washington, D.C. 1986), pp. 166-182.

R.H. Holzworth et al., "Direct Measurement of Lower Atmospheric Vertical Potential Differences," Geophys. Res. Lett. 8: 783-786 (1981).

R.H. Holzworth, "Hy-wire Measurement of Atmospheric Potential," J. Geophys. Res. 89: 1395-1401 (1984).

R.E. Orville, in the Earth's Electrical Environment, Studies in Geophysics (National Academy Press, Washington, D.C. 1986), pp. 23-29.

R.B. Standler & W.P. Winn, "Effects of Coronae on Electric Fields Beneath Thunderstorms," Quart. J.R. Met. Soc. 105: 285-302 (1979).

R.A. Oliva & C.W. Dale, "Circuit Analysis Methods", in DC Circuits, vol. II (Radio Shack, Fort Worth, Texas, 1979), pp. 13-8 to 13-12.

W.M. Hayt, Jr. & J.E. Kemmerly. "Engineering Circuit Analysis" (3rd ed., McGraw-Hill, New York, 1978), pp. 146-152.

H. Christian et al., "Airborne and Ground Based Studies of Thunderstorms in the Vicinity of Langmuir Laboratory," Q. J. R. Meteorol. Soc. 106: 159-175 (1980).

T.C. Marshall & W.P. Winn, "Measurements of Charged Precipitation in a New Mexico Thunderstorm: Lower Positive Charge Centers," J. Geophys. Res. 87:. 7141-7157 (1982).

P. Grandics, "A Method to Capture Atmospheric Electrostatic Energy", in Proceedings of IEJ-ESA Joint Symposium on Electrostatics, (Kyoto University, Kyoto, Japan, 2000), pp. 355-361.

P. Grandics, "The Genesis of Fundamental Forces Acting at a Distance," Infinite Energy 12: 13-24 (2007).

P. Grandics, "The Genesis of Electromagnetic and Gravitational Forces," J. New Energy 6: 33-45 (2007).

R.A. Kerr, "Will the Arctic Ocean Lose All Its Ice," Science 286: 1828 (1999).

S.A. Laxon et al., "High Interannual Variability of Sea Ice Thickness in the Arctic Region," Nature 425: 947-950 (2003).

http://www.pyramidoflife.com/eng/tests_experiments.html.

T.C. Marshall & M. Stolzenburg, "Voltages Inside and Just Above Thunderstorms," J. Geophys. Res. 106: 4757-4768 (2001).

\* cited by examiner

PYRAMID ELECTRIC GENERATOR

CROSS-REFERENCES

This application is a continuation-in-part of PCT Application Ser. No. PCT/US07/69804 by Grandics, entitled "An Electric Power Converter for Extraction of Atmospheric Electrical Energy," designating the United States and filed on May 25, 2007, which in turn claimed priority from U.S. Provisional Application Ser. No. 60/818,360 by Grandics, also entitled "An Electric Power Converter for Extraction of Atmospheric Electrical Energy," and filed on Jul. 3, 2006. The specifications of these two applications are incorporated herein in their entirety by this reference.

BACKGROUND OF THE INVENTION

This invention relates to the generation of electrical power by drawing energy from Earth's electric field. Earth represents a resonant system in which both atmospheric and telluric electrical processes can be harvested. In U.S. Pat. No. 6,974,110, we have provided an apparatus and method for converting the electrostatic potential energy of Earth's atmosphere. The present invention aims to provide an electric generator that, in addition to tapping atmospheric electric processes, extracts electrical power from the vibrational energy of atomic oscillators by a novel resonant coupling method.

SUMMARY OF THE INVENTION

An electrical generator according to the present invention provides a new method of tapping Earth's electric energy field.

One aspect of the present invention is an apparatus for capturing both atmospheric and telluric electric energies, comprising:

(1) an antenna/waveguide that is geometrically optimized, having a conducting surface;

(2) a primary coil wound with a conductor over a secondary coil, the coil being attached electrically to a driver operating in the LF radio band; and (3) a secondary coil smaller in diameter than the primary coil having a greater length and a greater number of turns than the primary coil and having a first lead and a second lead, the secondary coil being positioned coaxially within the first coil and acting as a resonant step-up transformer winding, inductively coupled with the primary coil and an external capacitor connected in parallel with the secondary coil to provide a specific resonant frequency; or (4) a secondary coil smaller in diameter than the primary coil, having a greater length and a greater number of turns than the primary coil and having a first lead and a second lead, the secondary coil being positioned coaxially within the first coil and acting as a resonant step-up transformer winding, inductively coupled with the primary coil and connected with the antenna/waveguide serving as a quasi-capacitive series element to provide a specific resonant frequency;

wherein the conducting surface of the antenna/waveguide is configured such that the secondary coil is connected near the point at which the electric field contacts the antenna/waveguide;

wherein the generator absorbs electromagnetic impulses from Earth's electric field; and wherein a high voltage sinusoidal waveform is generated in the secondary coil representing harvested atmospheric and telluric electrical energy and measurable on the leads of the secondary coil.

Preferably, the antenna/waveguide is of pyramidal shape. When the antenna/waveguide is of pyramidal shape, the secondary coil is preferably connected near or at the apex of the antenna/waveguide.

Another aspect of the present invention is an electric generator for harvesting the electric emissions of atomic oscillations comprising an oscillator. Typically, the oscillator operates in the LF or ELF bands.

Typically, in this aspect of the present invention, the generator comprises:

(1) a primary coil wound with a conductor over a secondary coil, the coil being connected electrically to a driver operating in the LF or ELF bands; and (2) a secondary coil of smaller diameter than the primary coil having a greater length and a greater number of turns than the primary coil, the secondary coil being positioned coaxially within the first coil and acting as a resonant step-up transformer winding inductively coupled with the primary;

wherein said resonant step-up transformer's output voltage exceeds 500 $V_{RMS}$;

wherein the electric generator attracts impulses from Earth's electric oscillations; and wherein the attracted energy manifests as high voltage sinusoidal waveforms representing harvested electric energy of atomic oscillations in the secondary coil and measurable on leads of the secondary coil.

Another aspect of the present invention is a method of tapping Earth's electric energy field, comprising these steps:

(1) positioning an electric generator according to the present invention as described above, so that it is exposed to a source of atmospheric and telluric electric energy; and (2) producing a high-voltage sinusoidal signal representing electrical energy harvested by the operation of the generator.

BRIEF DESCRIPTION OF THE DRAWINGS

The following invention will be better understood with reference to the specification, appended claims, and accompanying drawings, where:

DETAILED DESCRIPTION OF THE INVENTION

Figure 1:
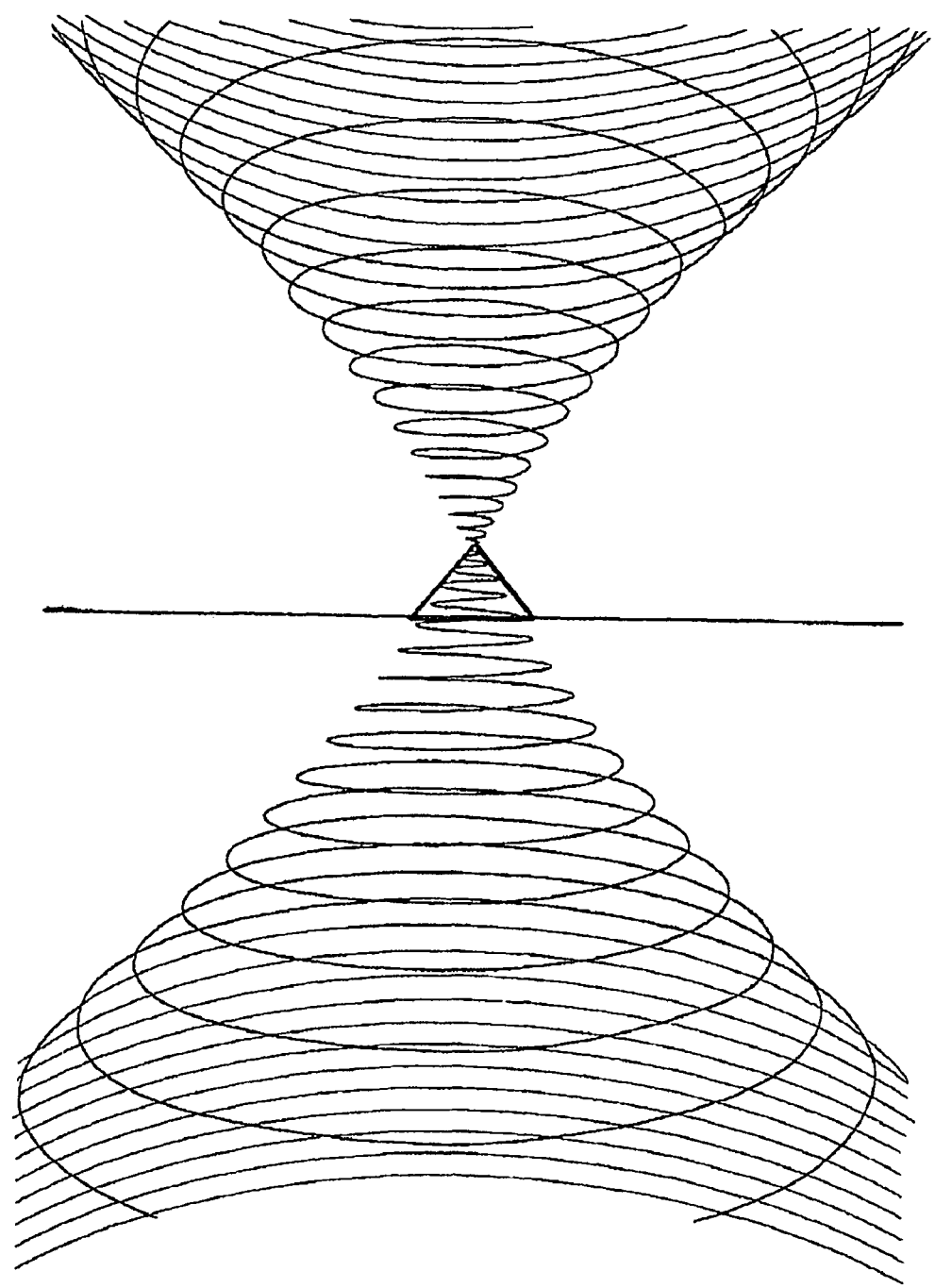
FIG. 1 is a graph showing the formation of electric vortices across and around the pyramid.

One aspect of the present invention is an electric generator for attracting the electric emissions of atomic oscillations by the use of high voltage, to harvest electric energy therefrom.

One embodiment of this aspect of the invention is an apparatus for capturing atmospheric and telluric electric energies by harvesting the energies of atomic oscillators, comprising:

(1) an antenna/waveguide that is geometrically optimized, having a conducting surface;

(2) a primary coil wound with an insulated conductor, the coil being connected to an AC or AC-DC driver; and (3) a secondary coil smaller in diameter than the primary coil, having a greater length and a greater number of turns than the primary coil and having a first lead and a second lead, the secondary coil being positioned coaxially within the first coil and acting as a resonant step-up transformer winding, inductively coupled with the first coil; and an external capacitor connected in parallel with the secondary coil to provide a specific resonant frequency; or (4) a secondary coil smaller in diameter than the primary coil, having a greater length and a greater number of turns than the primary coil and having a first lead and a second lead, the secondary coil being positioned coaxially within the first coil and acting as a resonant step-up transformer winding, inductively coupled with the first coil and connected with the antenna/waveguide serving as a quasi-capacitive series element to provide a specific resonant frequency, with the secondary coil attached near the point at which the electric field contacts the antenna/waveguide;

wherein the generator absorbs electromagnetic impulses from Earth's electric field; and wherein a high-voltage, sinusoidal waveform is generated in the secondary coil representing harvested atmospheric and telluric electrical energy and measurable on leads of the secondary coil.

Preferably, the antenna/waveguide is of pyramidal shape. However, any geometric shape can be used for the antenna/waveguide. When it is of pyramidal shape, the secondary coil is preferably connected near or at the apex of the antenna/waveguide. The shape and size of the antenna/waveguide can be optimized depending on the intended use of the generator. Preferably, the antenna/waveguide exhibits ratios of pi and the Fibonacci number (phi).

Typically, the generator further comprises an insulated base on which the antenna/waveguide is placed. The size and shape of the insulated base can also be optimized, depending on the intended use of the generator. The second lead of the secondary coil is typically connected to earth ground.

Typically, the output of the secondary coil is harvested. This can be done by connecting to a rectifier-capacitor-load resistance, or by a third coil inductively coupled with the secondary coil. In one alternative, the output of the secondary coil is coupled to a load for drawing power from the generator. The optimal circuit can be selected by one of ordinary skill in the art to optimize power extraction. The load draws power from the generator. The load can be a resistor, a rectifier or a storage capacitor powering a DC load. Typically, the antenna/waveguide is at a high voltage during the operation of the generator. Typically, the antenna/waveguide voltage is greater than 500 $V_{RMS}$. The antenna/waveguide can be connected to an oscillator. The oscillator can comprise a resonant step-up transformer.

Typically, the antenna/waveguide is in resonance with the secondary coil. Typically, the primary coil is inductively coupled to the secondary coil.

Typically, the antenna/waveguide is positioned in a generally north-south direction to tap atmospheric and telluric electric energy. In this arrangement, when the antenna/waveguide is of pyramidal shape, the height of the pyramid can be from about 0.5 m to about 1000 m, more typically, from about 0.50 m to about 150 m. The optimal pyramid size is a function of the power requirements. However, a pyramid can be built even 1 km in height. Typically, the base surface area of the pyramid ranges from about 0.25 $m^2$ to about 1,000,000 $m^2$; more typically, from about 0.25 $m^2$ to about 25,000 $m^2$. Naturally, other heights and base surface areas can be used for particular applications. The numbers of sides can also vary. When the pyramid is small (e.g., 6-feet base length described in this application), there is an insufficient atmospheric potential on its apex to trigger the attraction of power. In such event, an AC or AC-DC driver is necessary to bring the pyramid to the electric potential necessary. A suitable voltage is typically greater than 500 $V_{RMS}$.

In one alternative, the primary coil is wound with a conductor over the secondary coil, the primary coil being connected electrically to a driver operating in the LF or ELF bands.

Another aspect of the present invention is an electric generator for harvesting the electric emissions of atomic oscillations comprising an oscillator. Typically, the oscillator operates in the LF or ELF bands.

Typically, in this aspect of the present invention, the generator comprises:

(1) a primary coil wound with a conductor over a secondary coil, the coil being connected electrically to a driver operating in the LF or ELF bands; and (2) a secondary coil of smaller diameter than the primary coil having a greater length and a greater number of turns than the primary coil, the secondary coil being positioned coaxially within the first coil and acting as a resonant step-up transformer winding inductively coupled with the primary;

wherein said resonant step-up transformer's output voltage exceeds 500 $V_{RMS}$;

wherein the electric generator attracts impulses from Earth's electric oscillations; and wherein the attracted energy manifests as high voltage sinusoidal waveforms representing harvested electric energy of atomic oscillations in the secondary coil and measurable on leads of the secondary coil.

In this alternative, the output of the secondary coil can be coupled to a load for drawing power from the generator.

Another aspect of the invention is a method of tapping Earth's electric energy based on the following concepts:

(1) utilizing a pyramidal antenna/waveguide designed based on the ratios of pi and phi;

(2) using the antenna/waveguide to absorb and focus specific frequencies of Earth's electric field;

(3) positioning a resonant coil system connected to said antenna/waveguide near or at its apex according to the present invention; and (4) generating a high-voltage sinusoidal signal, representing harvested atmospheric and telluric electrical energy, by the operation of the coil system.

Typically, in this method, the method comprises the steps of:

(1) positioning an electric generator according to the present invention as described above such that it is exposed to Earth's electric oscillations; and (2) generating a high voltage sinusoidal signal representing harvested electric energy of atomic oscillators by the operation of the generator.

Typically, the harvested electric energy can be fed into a power grid for distribution, but smaller units capable of distributed power generation or for use as stand-alone generators are also feasible by the concept of this invention.

The invention is described by the following Example. This Example is included for illustrative purposes only and is not intended to limit the invention.

EXAMPLE

We have introduced a new theory of space, energy and matter that predicted that electromagnetic interaction propagates through a carrier medium called the space lattice that is made up of pulsating, phi-based spiral vortices (STAR), the excitation of which generates propagating sinusoidal lines of force across the space lattice recorded as electromagnetic waves by our instruments [1,2]. We have also predicted that natural pressure gradients exist within the space lattice that can be used for power generation by inserting a capacitor into such gradient. Furthermore, we proposed that a pyramid-shaped capacitor is an optimally shaped device for tapping the energy gradient of the space lattice that manifests in the form of an electrical potential gradient in Earth's atmosphere. This was demonstrated subsequently [3-5]. We also found that the pyramid-shaped capacitor design should be based on ratios of pi and phi [5] because electrical energy propagates along a phi-based spiral [6].

We suggested that elemental particles are composed of STAR oscillators that make up the space lattice by electromagnetic compression of its elemental cubes into pulsating conical/vortexual subunits that form the basis for all particles of matter [1,2]. We proposed that atomic and subatomic oscillators could vibrate in a very wide frequency range from sub-acoustic to extremely high EM frequencies [1,2]. This does not mean that material bodies can take or maintain a physical form at any energy level, but this allows the recycling of atoms into the space lattice as part of their natural evolution [2,6].

Atomic oscillators are constantly in motion, and such motion is electric because all motion and energy is fundamentally electric [2,6]. It is known that atomic bodies constantly exchange electric energy. Such energy flow can be harvested when the spiral physical nature of electric waves is recognized. Russell observed that energy always moves during its generative cycle in spirals towards the higher potential [7]; therefore, we reasoned that an "attractor" of high electric potential must be provided to pull in the random electromagnetic emissions of atomic oscillators. The "attractor" must function as a phi-based antenna/waveguide to focus the phi-based electric emissions of atomic bodies into the apex of a vortex, the same method Nature uses for power multiplication [6,7]. Therefore, a phi-based pyramidal antenna/waveguide must be at a high voltage in order to perform its attractor function.

As all material manifestations are tonal [8], acoustic vibrations are always generated during the oscillations of atomic bodies, even though they are inaudible most of the time. Sometimes, however, they are detected; one such example is Earth's hum [9-11]. Earth's solid mass and its atmosphere represent a coupled resonant system, and is therefore our expanded target power source. Acoustic waves are also electrical [8] and can be harvested. To achieve this goal, the geometrically optimized pyramidal antenna/waveguide must be connected to an oscillator that operates at a high voltage and is tuned to a suitably selected frequency.

The appropriate resonant frequency is dictated by practical considerations. Atomic oscillators can vibrate in a very wide frequency range [1,2,6-8] but short wavelength radiations are readily re-absorbed by atoms and are rapidly attenuated; therefore, long wavelength electromagnetic emissions must be targeted. The operation of the pyramid generator is feasible in the ELF to the LF range. As electric radiation propagates in a vortex [2,6-8], the emitted electric vortex over the pyramidal antenna (FIG. 1) increases its "size," and so it is capable of funneling atmospheric electromagnetic emissions of the same frequency back into the antenna/receiver. Thus, the pyramid electric generator could capture the energy emitted by both telluric and atmospheric atomic oscillators. We have tested these assumptions and demonstrated the basic principles of an electric generator.

Methods and Results

In our previous papers, we reported that a pyramid-shaped capacitor/antenna converts atmospheric electrostatic discharge impulses (ESD) into a periodic high-frequency signal that can be detected in an insulated coil placed in proximity of the capacitor [3,4]. Here, we report on further developments including a new design for the resonant coil system and an expanded range of energy sources targeted. A Tektronix TPS 2024 digital oscilloscope was used for signal acquisition and analysis, and Tektronix A503 current amplifiers were used with the Tektronix A6302 and A6303 probes for current measurement. High voltage was measured using a Tektronix P6015 probe. An ENI-1140LA amplifier was used to activate the primary coil of the resonant coil system at the selected frequency.

For the experiments, we used a geometrically optimized pyramid-shaped antenna/waveguide [3-5]. The pyramid expressed ratios of pi and phi and was approximately a 1:125 scaled down replica of the Great Pyramid of Giza (GPF), 6 feet base length. The pyramid was built of a wooden frame and covered with triangular copper sheets of 0.66 mm thickness on its sides that were electrically connected. It was placed on an insulating base and positioned in the general North-South direction.

Figure 2:
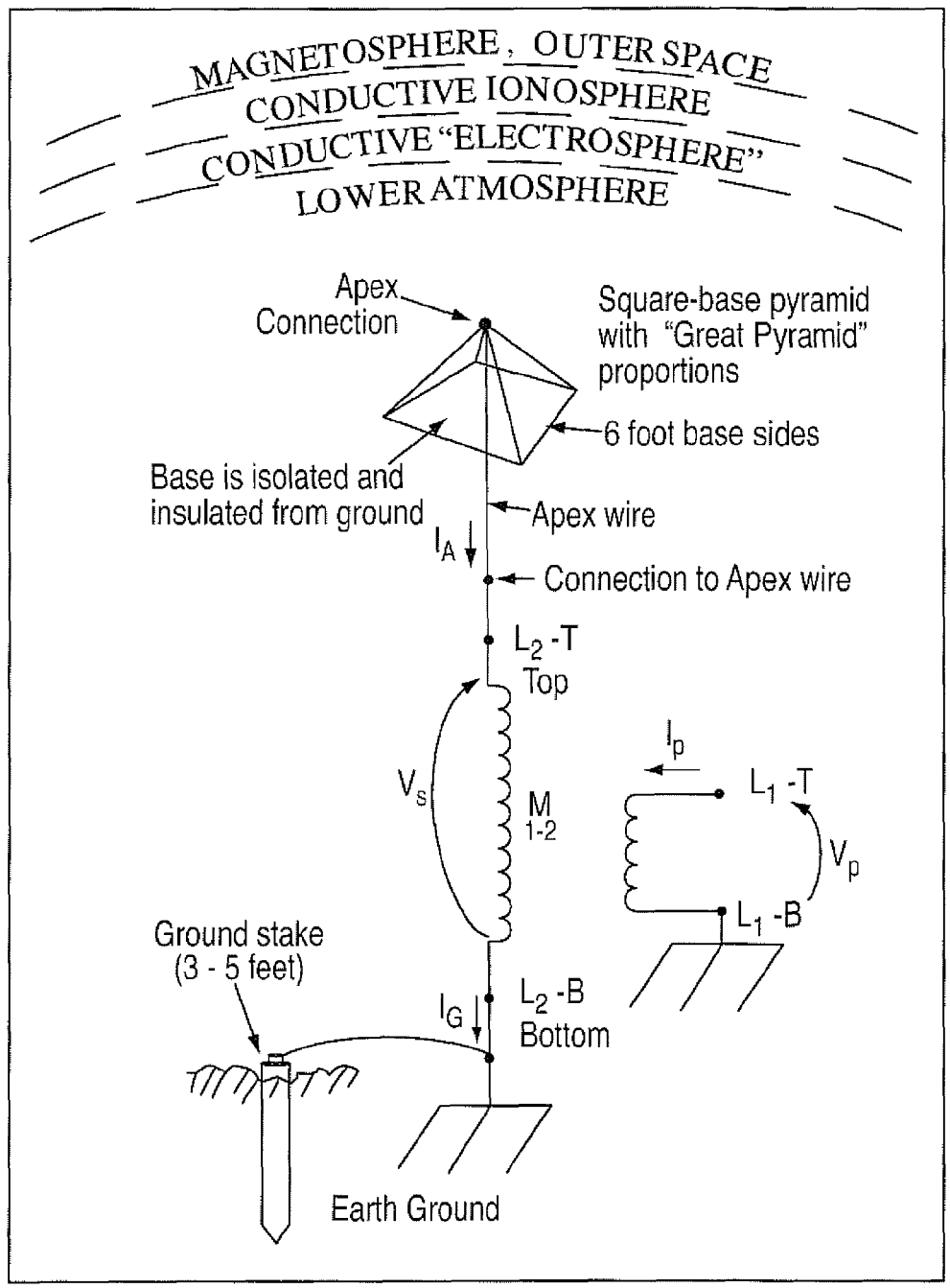
FIG. 2 is a graph showing the circuit diagram of the pyramid generator.

The secondary coil (coil 2) was wound with a 20 AWG insulated magnet wire with a monofilament nylon spacer (0.06 mm diameter) between the turns on a fiberglass cylindrical coil form, and connected to the conducting surface of the pyramid near its apex. Thus, the secondary coil was connected with the pyramidal antenna/waveguide as a quasi-capacitive series element to provide a specific resonant frequency with coupling to the surrounding electromagnetic environment. The other lead of coil 2 was grounded (FIG. 2). The purpose of the monofilament spacer was to reduce inter-winding capacitance in coil 2 by increasing distance between wire turns of the coil.

A primary coil of larger diameter (coil 1) was wound on or near the lower cylindrical volume of coil 2 with the lead connected to earth ground, and served as a driver coil inductively coupled with the secondary (coil 2). The secondary was isolated from the primary by layers of silicon rubber and foam. The two coils make a resonant step-up transformer, the parameters of which are shown in Table 1.

TABLE 1

Physical and Electrical Parameters of the Resonant Transformer

| | |
|---|---|
| Secondary turns of wire | 840 turns |
| Height | 0.85 m |
| Wire diameter | 0.00081 m |
| Primary turns of wire | 5 + 9/10 turns |
| Height | 0.21 m |
| Wire diameter | ¼" O.D. copper pipe with .030" wall thickness |

| Primary | |
|---|---|
| Inductance | 98 µH |
| Resistance | 0.118 ohms |

| Secondary | |
|---|---|
| Inductance | 24.16 mH |
| Resistance | 24.42 ohms |
| Capacitance | 1040 nF |
| Winding ratio | 1:143 |
| Mutual inductance | 6.13 mH |

In the experiment; the controlled variable was the voltage, which was increased in steps until the maximum voltage in the secondary (permitted by circuit components and test equipment) was achieved for the given resonant frequency. The objective was to "drive the atmosphere" by radiating a high voltage (~20 kV p-p), LF (40-120 kHz) signal developed by the high ratio step-up transformer and fed by a powerful signal generator at a resonant frequency either with an L-C resonant secondary coil, or a resonance determined by the pyramid as a quasi-capacitive series element connected to the secondary coil of the transformer and radiating to the local atmosphere. The data are shown in Table 2.

Figure 3:
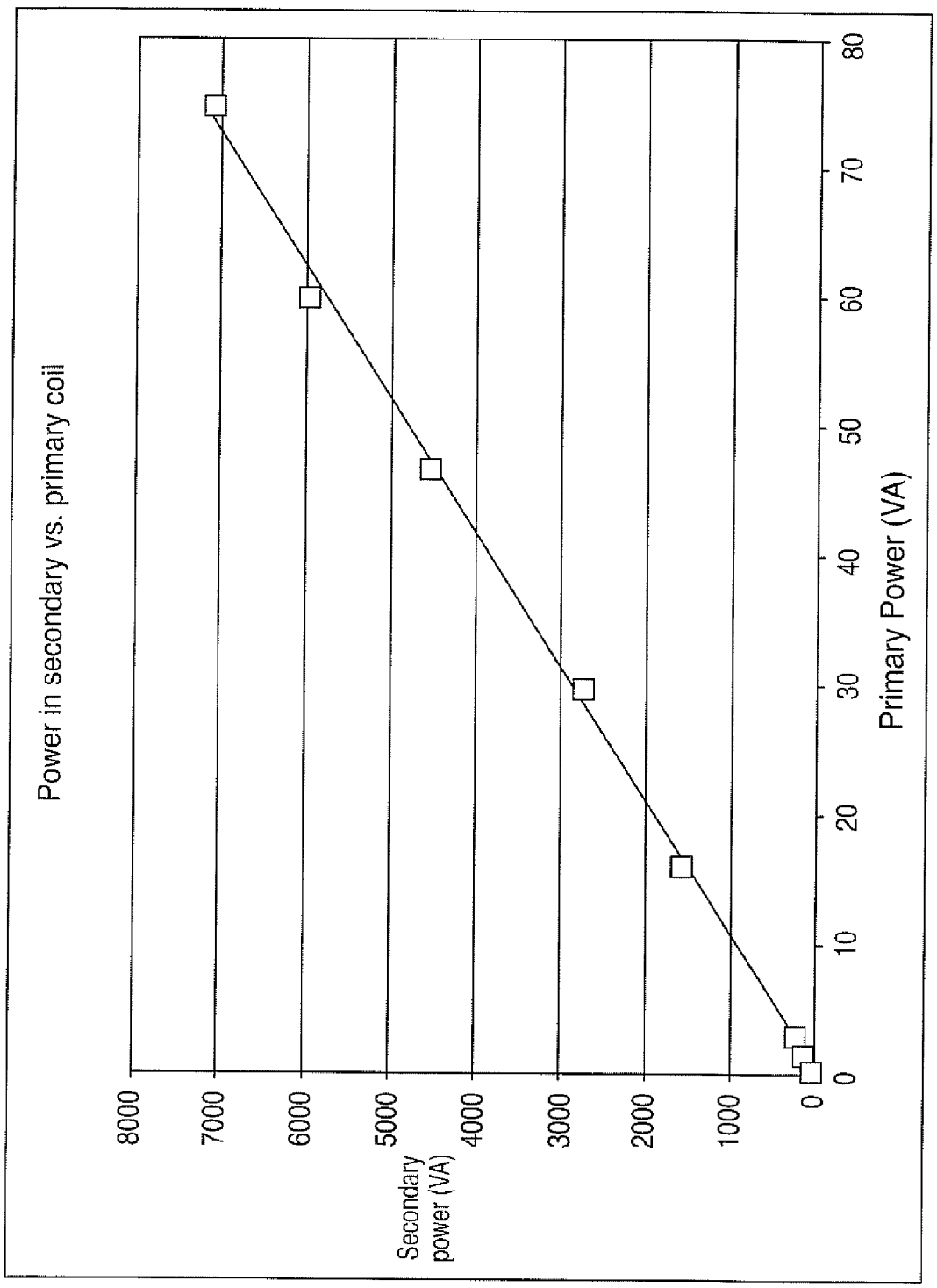
FIG. 3 is a graph showing the power in the secondary coil vs. the power in the primary coil.
Figure 4:
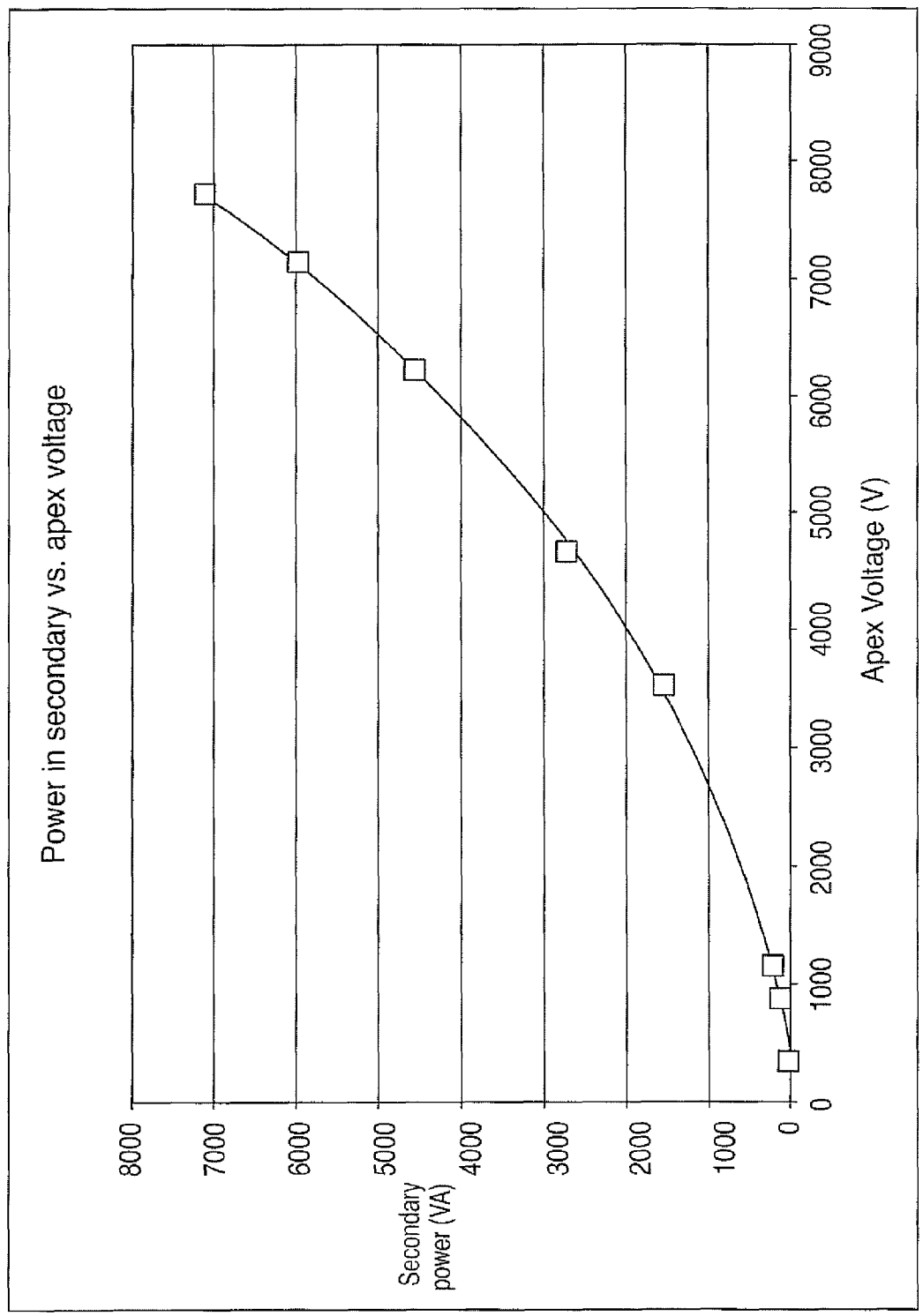
FIG. 4 is a graph showing the power in the secondary coil vs. the apex voltage on the pyramid.

The experimental data are shown in Table 2. The current readings were also confirmed by using "current sensing" resistors (not shown). A apparent power gain of nearly 100-fold was achieved in the secondary coil relative to input power in the primary coil, and a linear increase of power in the secondary coil with the increase of input power into the primary coil (FIG. 3). The power in the secondary coil exponentially increases with the pyramid apex voltage (FIG. 4).

TABLE 2

Power Measurements in the Pyramid-Resonant Coil System

Primary

| Frequency (kHz) | 83.00 | | | | | | | |
|---|---|---|---|---|---|---|---|---|
| $V_{P\,RMS}$ | 3.97 | 6.38 | 9.86 | 20.3 | 26.7 | 33.8 | 39 | 40.8 |
| $I_{P\,RMS}$ (mA) | 87.6 | 222 | 300 | 792 | 1117 | 1389 | 1541 | 1838 |
| $I_{P\,angle\,with\,respect\,to}\,V_P$ | 18° | 24° | 14° | 22° | 23° | 21° | 20° | 28° |
| Total power (VA) | 0.35 | 1.42 | 2.95 | 16.02 | 29.70 | 46.77 | 59.95 | 74.75 |
| True power (W) | 0.33 | 1.30 | 2.87 | 14.85 | 27.35 | 43.66 | 56.34 | 66.01 |

Secondary

| $V_{S\,RMS}$ | 341 | 872 | 1150 | 3540 | 4670 | 6220 | 7140 | 7710 |
|---|---|---|---|---|---|---|---|---|
| $I_{A\,RMS}$ (mA) | 62.2 | 148 | 193 | 438 | 579 | 728 | 834 | 919 |
| $I_{A\,angle\,with\,respect\,to}\,V_S$ | 42° | 43° | 44° | 52° | 52° | 54° | 53° | 52° |
| Total power (VA) | 21.2 | 129.5 | 222.8 | 1552 | 2707.8 | 4530.2 | 5957.5 | 7087.3 |
| True power (W) | 15.7 | 94.7 | 160.3 | 956 | 1668.1 | 2664.5 | 3587.6 | 4366 |
| Power sec/prim | 61.1 | 91.4 | 75.4 | 96.9 | 91.2 | 96.9 | 99.4 | 94.8 |

A load may be connected to coil 2 to draw power from the system. The load may also be connected via a tertiary coil inductively coupled to the secondary coil. The load may be a resistor, a rectifier or storage capacitor powering a DC load.

Figure 5:
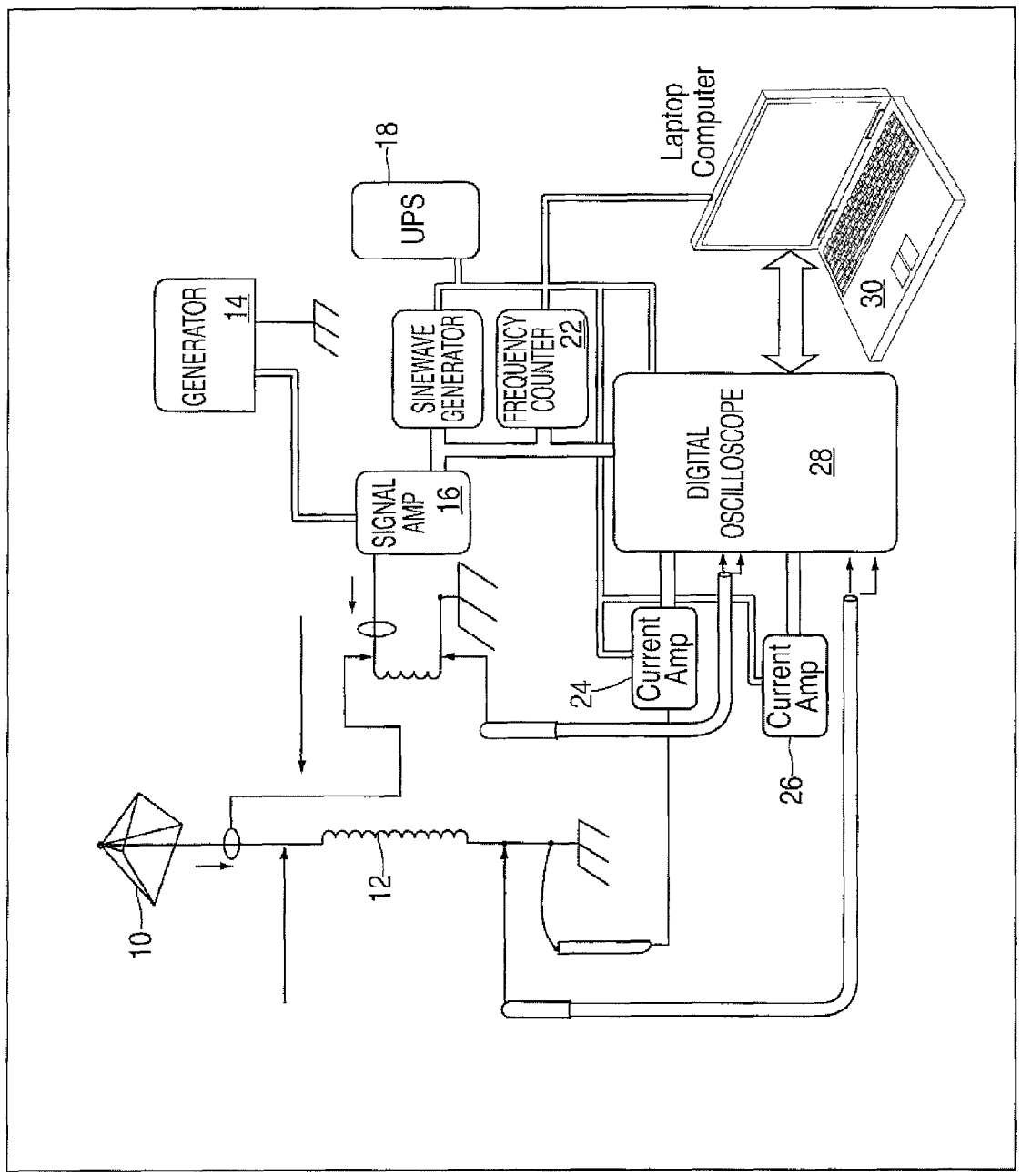
FIG. 5 is a graph showing the circuit diagram of the pyramid generator with the measurement points.

A graphic representation of the test system is shown in FIG. 5. The pyramidal antenna/waveguide, placed on an insulating base, is coupled to the surrounding electromagnetic environment and serves as an antenna/waveguide for the concentration of atmospheric and telluric electromagnetic oscillations at resonance frequency. As the flow of electric energy is always balanced [6], two vortices may cross the pyramidal antenna: one from the direction of the ground concentrating into its apex, and another one from its apex propagating into the atmosphere (FIG. 1). The atmospheric electric vortex possibly acts as an ionic antenna pulling in EM radiations from a large atmospheric domain. In FIG. 5, the antenna/waveguide 10 is attached to a coil 12. To drive the system, a RF generator 14 is connected to a signal amplifier 16. The signal amplifier 16 is also connected to an uninterruptible power supply (UPS) 18 through a sinewave generator 20 and a frequency counter 22. Outputs from the sinewave generator 20 and frequency counter 22 are also connected to a first current amplifier 24. The output from the antenna/waveguide 10 and coil 12 are also connected to a second current amplifier 26. The sinewave generator 20, frequency counter 22, first current amplifier 24, and second current amplifier 26 are connected to a digital oscilloscope 28. Outputs from the antenna/waveguide 10 and coil 12 are also connected to the digital oscilloscope 28. A laptop computer 30 controls the sinewave generator 20 and frequency counter 22.

The pyramid's apex is attached to a coil of high turn number (FIGS. 2 & 4). This secondary coil wound on a nonconductive coil form serves as a step-up transformer, and forms a resonant circuit with the pyramid that acts as a quasi-capacitive series element. The secondary coil is activated by a signal from an RF generator via a primary coil of a few turn numbers inductively coupled to coil 2. The measurement points are also indicated, displaying the positions of voltage and current probes. The data are captured by a digital oscilloscope and recorded on a laptop computer.

Discussion

This invention demonstrates a novel approach to harvest Earth's electric energy. The masses of Earth and its atmosphere represent a coupled resonant system that is continually electrified by solar radiation. We have found that a pyramidal antenna designed based on the ratios of phi and pi is optimal for the capture of atmospheric electrostatic discharge (ESD) impulses [3-5]. Atmospheric ESD is a product of solar radiation and is a wide bandwidth phenomenon. The pyramid as a wideband, non-resonant antenna is uniquely adapted to harvest the energy of atmospheric ESD.

This invention also points out an additional energizing mechanism at work during the operation of the pyramid electric generator. The observation is derived from our theory on energy, matter and space [1,2] as well as that of Russell [6,7]. Both Russell and we observed that spiral motion is a fundamental action of matter and that the vortex is the mechanism of power multiplication in Nature. A vortex concentrates power into its apex where the highest velocity of motion, the highest pressure and the highest electric potential resides [1,2,6,7]. As electricity propagates along a pulsating phi-based spiral [6,7], a phi-based antenna/waveguide is suitable to focus its energy into the apex of a vortex inside the antenna. A phi-based pyramid is optimal for this purpose.

As atomic bodies can oscillate in a very wide frequency range [1,2,6-8], a pyramidal antenna/waveguide coupled to an oscillator that is tuned to a suitable frequency can focus the "electric noise" from Earth's atomic oscillators into the apex of the pyramid at a high voltage. Russell observed that energy moves towards the higher potential during its generative cycle [7]; therefore, it is essential that the pyramidal antenna be at a high potential. Our data corroborated this assumption.

To select a suitable frequency range, one can begin with the observation that all material manifestations are tonal [8], and that acoustic frequencies are always generated during the oscillations of atomic bodies even though they remain inaudible most of the time. Acoustic waves are also electric [8] and therefore Earth's enormous mass and its atmosphere represent a coupled resonant system that offer a vast source of power.

For practical reasons on our small pyramid, we have chosen a frequency above the audio range but below the radio frequency spectrum; our antenna was made to radiate at the target wavelength. The wavelength of the 50-120 kHz range is 6 km to 25 km, thus allowing energy to be harvested over a large atmospheric domain. As electrical energy propagates in a vortex [6,7], the emitted electric vortex (ionic antenna) over the pyramidal antenna/waveguide increases its "size" and enables it to funnel the same frequency atmospheric electromagnetic radiations back into the antenna. Thus, the pyramid electric generator captures at the selected frequency the energy emitted by Earth's atomic oscillators.

The presence of an electric (ionic) vortex was demonstrated by radar testing of the space over a 44 m tall fiberglass pyramid located near Moscow [12]. The Russians found that the large ionized column of air over the area of the vertical axis of the pyramid had a width of about 500 m and reached an altitude of 2 km. It is remarkable that this effect was induced by a nonconductive pyramid surface demonstrating a significant degree of atmospheric ionization even under fair weather conditions. Thus, a suitably sized large or an electrically activated small pyramid should open a low impedance path to higher elevations of relatively conductive atmospheric domains.

In conclusion, the total power that can be extracted from Earth's atomic oscillators must be extremely large, likely far exceeding current global electric generation capacity. In our experiment, we obtained over 7000 VA power at about 20 kV p-p pyramid voltage using a 6 feet base length pyramid. This power is nearly 100 times greater than the power necessary to drive the pyramid to the required operating voltage. By constructing the pyramid generator from dedicated high voltage components and using higher drive voltages, a significant increase in power output is envisioned. The power extraction will also be enhanced by further optimization of the designs of both the pyramid and the coil system.

The power output will also increase by employing larger pyramid structures and coils. As voltage is the primary factor in attracting power into the system, the necessary voltage can be provided by the vertical atmospheric potential on a tall pyramid. Since the atmospheric vertical potential gradient could go as high as 1200 V/m near Earth's surface under fair weather conditions [13], a pyramid height of 80-150 m seems sufficient to provide the apex voltage for a self-sustaining power generator. As the pyramid scales up volumetrically, a power generator pyramid of the size range of the GPG could likely have an output in the hundreds to thousands of megawatts range. Groups of several pyramid electric generators could be placed within specific geographical areas, thus combining their energy harvesting capacity.

References

The following references are specifically applicable to the Example and are incorporated herein by reference; these references are referenced in the Example by the reference numbers assigned to them.

[1] Grandics, P. 2002, "The genesis of electromagnetic and gravitational forces." *J. New Energy*, 6, (3) 33-45.
[2] Grandics, P. 2007, "The genesis of fundamental forces acting at a distance and some practical derivations." *Infinite Energy*, 12, (71) 13-24.
[3] Grandics, P. 2000, "A method to capture atmospheric electrostatic energy", in *Proceedings of IEJ-ESA Joint Symposium on Electrostatics*, Kyoto University, Kyoto, Japan, pp. 355-361.
[4] Grandics, P. 2006, "A DC to RF converter for the capture of atmospheric electrostatic energy", in *Proceedings of the $5_{th}$ Conference of the Societe Francaise D'Electrostatique, SFE* 2006, Grenoble, France pp. 279-284.
[5] Grandics, P. 2007, "Pyramidal Electric Transducer: A DC to RF Converter for the Capture of Atmospheric Electrostatic Energy." *Infinite Energy*, 13, (73) 20-27.
[6] Russell, W. 1947, in *The Secret of Light*, $3_{rd}$ ed. University of Science and Philosophy, Waynesboro, Va., pp. 218-288.
[7] Russell, W. 1957, in *Atomic Suicide?* $2_{nd}$ ed. University of Science and Philosophy, Waynesboro, Va., pp. 129-153.
[8] Russell, W. 1926, in *The Universal One*, University of Science and Philosophy, Waynesboro, Va., pp. 247-249.
[9] Nishida, K., Kobayashi, N. and Fukao, Y. 2000, "Resonant oscillations between the solid earth and the atmosphere", *Science* 287, (5461), 2244-2246.
[10] Tanimoto, T., Um, J., Nishida, K., and Kobayashi, N. 1998, "Earth's continuous oscillations observed on seismically quiet days", *Geophys. Res. Lett.* 25, 1553-1556.
[11] Tanimoto, T. 2001, "Continuous free oscillations: Atmosphere-solid earth coupling". *Ann. Rev. Earth Planet Sci.* 29, 563-584.
[12] http://www.pyramidoflife.com/eng/tests_experiments.html.
[13] Marshall, T. C., Rust, W. D., Stolzenburg, M., Roeder, W. P., and Kriebel, P. R. 1999, "A study of enhanced fair-weather electric fields occurring soon after sunrise". *J. Geophys. Res.* 104, 24,455-24, 469.

ADVANTAGES OF THE INVENTION

The present invention provides a new method of tapping Earth's electric energy and providing usable power that can be fed into a power grid or supplied by stand-alone power generators. It does so without the need for mechanical energy or the consumption of fossil fuel or the long-term risks associated with power generated by nuclear fission, including the risk of diversion of fissionable material to terrorist aims or the risk posed by the required long-term storage of spent nuclear fuel. Devices according to the present invention can operate virtually continuously with little to no maintenance.

With respect to ranges of values, the invention encompasses each intervening value between the upper and lower limits of the range to at least a tenth of the lower limit's unit, unless the context clearly indicates otherwise. Moreover, the invention encompasses any other stated intervening values and ranges including either or both of the upper and lower limits of the range, unless specifically excluded from the stated range.

Unless defined otherwise, the meanings of all technical and scientific terms used herein are those commonly understood by one of ordinary skill in the art to which this invention belongs. One of ordinary skill in the art will also appreciate that any methods and materials similar or equivalent to those described herein can also be used to practice or test this invention.

The publications and patents discussed herein are provided solely for their disclosure prior to the filing date of the present application. Nothing herein is to be construed as an admission that the present invention is not entitled to antedate such publication by virtue of prior invention. Further the dates of publication provided may be different from the actual publication dates which may need to be independently confirmed.

All the publications cited are incorporated herein by reference in their entireties, including all published patents, patent applications, and literature references, as well as those publications that have been incorporated in those published documents. However, to the extent that any publication incorporated herein by reference refers to information to be published, applicants do not admit that any such information published after the filing date of this application is to be considered prior art.

As used in this specification and in the appended claims, the singular forms include the plural forms. For example the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted to by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

I claim:

1. An electric generator for harvesting the energies of atomic oscillators comprising:
   (a) an antenna/waveguide that is geometrically optimized having a conducting surface;
   (b) a primary coil wound with an insulated conductor over a secondary coil, the coil being connected to an AC or AC-DC driver; and
   (c) a secondary coil of smaller diameter than the primary coil having a greater length and a greater number of turns than the primary coil and having a first lead and a second lead, the secondary coil being positioned coaxially within the first coil and acting as a resonant step-up transformer winding inductively coupled with the primary and an external capacitor connected in parallel with the secondary coil to provide a specific resonant frequency; or
   (d) a secondary coil of smaller diameter than the primary coil having a greater length and a greater number of turns than the primary coil and having a first lead and a second lead, the secondary coil being positioned coaxially within the first coil and acting as a resonant step-up transformer winding inductively coupled with the primary and connected with the antenna/waveguide serving as a quasi-capacitive series element to provide a specific resonant frequency;
   wherein the conducting surface of the antenna/waveguide is configured such that the secondary coil is attached near the point at which the electric field contacts the antenna/waveguide;
   wherein the generator absorbs impulses from Earth's electric oscillations; and wherein the attracted energy manifests as high voltage sinusoidal waveforms in the secondary coil, representing harvested atmospheric and telluric electrical energy and measurable on the leads of the secondary coil.

2. The electric generator of claim 1, wherein a suitable voltage is greater than 500 $V_{RMS}$.

3. The electric generator of claim 1, wherein the antenna/waveguide is designed based on ratios of pi and phi.

4. The electric generator of claim 1, wherein the antenna/waveguide is of pyramidal shape.

5. The electric generator of claim 1, wherein the antenna/waveguide is placed on an insulated base.

6. The electric generator of claim 1, wherein the antenna/waveguide is at a high voltage during the operation of the generator.

7. The electric generator of claim 6, wherein the antenna/waveguide voltage is greater than 500 $V_{RMS}$.

8. The electric generator of claim 1, wherein the antenna/waveguide is connected to an oscillator.

9. The electric generator of claim 8, wherein the oscillator comprises a resonant step-up transformer.

10. The electric generator of claim 4, wherein the secondary coil of the transformer is connected near the apex of the antenna/waveguide.

11. The electric generator of claim 1 wherein the second lead of the secondary coil is connected to earth ground.

12. The electric generator of claim 1 wherein the primary coil is wound with a conductor over the secondary coil, the primary coil being connected electrically to a driver operating in the LF or ELF bands.

13. The electric generator of claim 1, wherein the primary coil is inductively coupled to the secondary coil.

14. An electric generator for harvesting the electric emissions of atomic oscillations of claim 1 comprising an oscillator.

15. The electric generator of claim 14, wherein said oscillator operates in the LF or ELF bands.

16. The electric generator of claim 14 wherein the generator comprises:
   (a) a primary coil wound with a conductor over a secondary coil, the coil being connected electrically to a driver operating in the LF or ELF bands; and
   (b) a secondary coil of smaller diameter than the primary coil having a greater length and a greater number of turns than the primary coil, the secondary coil being positioned coaxially within the first coil and acting as a resonant step-up transformer winding inductively coupled with the primary; wherein said resonant step-up transformer's output voltage exceeds 500$V_{RMS}$;
   wherein the electric generator attracts impulses from Earth's electric oscillations; and wherein the attracted energy manifests as high voltage sinusoidal waveforms representing harvested electric energy of atomic oscillations in the secondary coil and measurable on leads of the secondary coil.

17. The electric generator of claim 4, wherein the height of the pyramidal electric generator is from about 0.50 m to about 1000 m.

18. The electric generator of claim 4, wherein the base surface area of the pyramid is from about 0.25 m$^2$ to about 1,000,000 m$^2$.

19. The electric generator of claim 1, wherein the generator is positioned in a generally north-south direction.

* * * * *